United States Patent

McCutchan, Jr.

Patent Number: 6,150,003
Date of Patent: Nov. 21, 2000

[54] WIRE CARRIER WITH REDUCED ELONGATION

[75] Inventor: Ben Ona McCutchan, Jr., Tega Cay, S.C.

[73] Assignee: Schlegel Corporation, Rochester, N.Y.

[21] Appl. No.: 08/934,364

[22] Filed: Sep. 19, 1997

[51] Int. Cl.[7] ..................................... B32B 5/08
[52] U.S. Cl. ........................ 428/105; 428/122; 49/490.1
[58] Field of Search .................................. 428/122, 105, 428/110; 49/490.1

[56] References Cited

U.S. PATENT DOCUMENTS

| | | | |
|---|---|---|---|
| 3,238,689 | 3/1966 | Cook | 52/717 |
| 3,430,387 | 3/1969 | Clapham | 49/491 |
| 4,343,845 | 8/1982 | Burden et al. | 428/122 |
| 4,413,033 | 11/1983 | Weichman | 428/122 |
| 4,624,093 | 11/1986 | Gibson | 52/716 |
| 5,072,567 | 12/1991 | Cook et al. | 428/122 |
| 5,204,157 | 4/1993 | Matsumiya | 428/105 |
| 5,416,961 | 5/1995 | Vinay | 28/165 |

FOREIGN PATENT DOCUMENTS

| | | |
|---|---|---|
| 2399496 | 3/1979 | European Pat. Off. . |
| 0175818 | 4/1986 | European Pat. Off. . |
| 0384613 | 8/1990 | European Pat. Off. . |
| 2149576 | 3/1973 | France . |
| 2205072 | 5/1974 | France . |

*Primary Examiner*—Alexander Thomas
*Attorney, Agent, or Firm*—Harter, Secrest & Emery LLP; Stephen B. Salai, Esq.; Brian B. Shaw, Esq.

[57] ABSTRACT

A wire carrier for use in the manufacture of weather seals is disclosed comprising a wire folded into a zig-zag configuration and having a plurality of generally parallel limbs for carrying a plurality of polymeric warp threads secured to the wire and at least one ribbon, having stiffening elements along its longitudinal axis, secured to the wire carrier such that the ribbon(s) runs substantially perpendicularly to the limbs of the wire. The ribbon may be secured to the wire by adhesive, by weaving, or by at least one row of warp thread. The resulting wire carrier is prevented from elongating during extrusion and thus a resulting product does not experience shrinkage. Methods for manufacturing the carrier are also disclosed.

23 Claims, 6 Drawing Sheets

WIRE CARRIER WITH REDUCED ELONGATION

FIELD OF THE INVENTION

The present invention relates to a wire carrier, such as a wire carrier used for reinforcement of an elastomeric strip used in sealing such as, for example, for gripping and covering edge flanges surrounding an opening in a vehicle body, and more particularly to a wire carrier which does not stretch during an elastomeric extrusion process and which in turn does not shrink after being final sized, installed, and throughout its life.

BACKGROUND OF THE INVENTION

Wire carriers typically comprise a continuous wire weft formed into a zig-zag formation with substantially parallel limbs interconnected by connecting regions at each end of the limbs onto which weft is knitted, sewn, threaded, or otherwise disposed a plurality of warp threads. These warp threads are typically a synthetic resin or a natural fiber.

Such a wire carrier is widely used, mainly as a reinforcing frame for coated polymeric products, especially extrusion coated products, such as weather seals on motor vehicles. During manufacture of the seals, the carrier is passed through an extruder and is thus subjected to stresses and temperatures which can cause the warp threads to drift laterally, stretch longitudinally and degenerate both physically and chemically. This can result, for example, in breakage of the warps and distortion of the wire carrier which affects the extrusion process and leads to reduced quality and performance of the corresponding seal. In forming and extrusion processes drifting of the warp threads can cause air bubbles and exposure of the wire in the final weather seal. Finally, when the warp threads are thus processed with a tensile stress during extrusion, the resultant product may experience shrinkage after being final sized and installed, which becomes a problem for the end customer. There has long been a need to develop a stable wire carrier for extruded and molded polymeric products which overcomes these problems and some attempts have been made without complete success.

The prior art has shown attempts at solving some of the above-described problems. One attempt to solve the problem of lateral warp shifting formed adjacent zig-zag loops into a propeller or banana shape, but this is difficult to control, and has little effect on preventing lateral warp drifting.

In another attempt to solve the problem of warp drift, Beck et al, EP Application No. 0175818, have suggested a knitted wire carrier with knotted junctions between the warp threads and the wire weft. Both the warp threads and the wire weft comprise polymeric or polymeric coated material and the polymeric material of the warp and the weft must both be melted to form a weld or fusion at the crossover points. This structure suffers from several disadvantages. It is difficult and expensive to provide either a polymer-coated wire weft, or the combination of an uncoated wire weft with a polymeric material which is fed to the knitting machine with the wire. Furthermore, the use of polymeric meltable materials in both the warp and weft increases the cost of the wire carrier. These disadvantages increase the costs enough that it could not be used commercially.

EP 0384613 discloses a knitted wire carrier in which stitched warp threads comprise two threads of polymeric material having different melting points such that when the melting point of the lower melting thread is exceeded the melted thread causes the other thread to be attached to the wire weft. This structure allows single strands of warp thread plied with a meltable filament to be bonded to the wire carrier wherever they are knitted.

Similarly, U.S. Pat. No. 5,416,961 to Vinay discloses a knitted wire carrier comprising at least one meltable filament laid-in into at least two adjacent warp threads, whereby on heating, the melted filament causes the at least two adjacent warp threads to be bonded to the wire and/or to each other for stabilizing the resulting wire carrier against warp drift. While the above constructions address warp drift, they do not address elongation.

The use of various materials for warp threads also does not solve the problem of elongation. That is, even using warp threads made from materials having zero to very low elongation factors does not completely prevent a wire carrier from suffering from elongation and eventual shrinkage. For example, even if fiberglass threads, which have a very low elongation factor, were used as the warp threads in a wire carrier, the knotted junctions of the threads wrapped around the carrier takes away from the ability of the threads to completely prevent elongation. While the short pieces of thread between the knots may be free of elongation during extrusion, the knots themselves are apt to become tighter during extrusion and looser after processing. Thus, tying knots in fiberglass or other threads with very low elongation factors takes away their ability to effectively prevent elongation throughout the wire carrier.

Thus, none of the above described constructions provides an entirely satisfactory structure for a wire carrier having warp threads attached to a wire support for use in a weather seal because none address the issue of shrinkage in the final product resulting from elongation of the warp threads during extrusion.

Thus, there is a need to reduce final product shrinkage by reducing wire carrier elongation during preforming, extrusion, and postforming. There is further a need to reduce the shrink that is realized in weather seals in the short term after extruding, during secondary operations, and after extended time in the field. There is further a need to retain the spacing between generally parallel limbs of a wire weft during extrusion processing for prevention of elongation. There is further a need for a simple, inexpensive elongation prevention mechanism to solve the above needs. There is further a need for such an elongation prevention mechanism which is easy to incorporate into the manufacture of a wire carrier.

SUMMARY OF THE INVENTION

Therefore, it is an object of the present invention to provide a wire carrier with an elongation prevention mechanism which prevents the shrink realized in weather seals after extruding and after extended time in the field.

It is another object of the present invention to provide an elongation prevention mechanism which substantially retains the relative spacing between adjacent limbs in a wire weft It is another object of the present invention to provide an elongation prevention mechanism which is inexpensive.

It is another object of the present invention to provide a ribbon usable as an elongation prevention mechanism and securable to a wire carrier.

It is a further object of the present invention to provide stiffening elements, such as fiberglass or carbon fiber threads, along the longitudinal axis of the ribbon.

It is a further object of the present invention to secure the ribbon to the wire carrier using warp threads.

It is another object of the present invention to secure the ribbon to the wire carrier using adhesive.

It is another object of the present invention to secure the ribbon to the wire carrier by weaving.

It is yet another object of the present invention to provide methods for manufacturing a wire carrier employing a ribbon elongation prevention mechanism.

Other objects will in part be obvious and in part appear hereinafter.

In a preferred embodiment of the present invention, a wire carrier for use in a weather seal may comprise a wire folded into a zig-zag configuration so as to have a plurality of generally parallel limbs interconnected at alternate ends by connecting regions for carrying polymeric warp threads on the parallel limbs, the wire carrier having a width substantially defined by a length of one of the plurality of generally parallel limbs, a plurality of warp threads, such as polymeric warp threads, knitted, sewn, threaded, or otherwise secured to the wire to encompass the wire within a stitch of each knitted row of warp thread, and at least one ribbon having stiffening elements along its longitudinal axis.

The ribbon(s) is preferably secured to the wire such that the stiffening elements extend substantially perpendicularly to the plurality of generally parallel limbs. The ribbon may be adhesively secured over at least one row of warp threads by providing an adhesive coating on the rear surface of the ribbon to form a tape. Alternatively, the ribbon may be trapped along its longitudinal axis between a securing row of warp thread and the wire. Alternatively, the ribbon may be weaved through the wire weft. The stiffening elements may comprise carbon or fiberglass threads, or other elements with zero to low elongation factor. The stiffening elements may be secured to each other in a weave by a weft thread.

The wire carrier may use a single ribbon positioned in a central location along the plurality of generally parallel limbs. Alternatively, a first ribbon may be positioned between a first set of warp threads and a second ribbon positioned between a second set of warp threads, such that the first ribbon, the second ribbon, the first set of warp threads, and the second set of warp threads are spaced apart along the width of the wire carrier. Alternate configurations are also within the scope of the invention.

In a method for manufacturing a wire carrier as disclosed in the present invention, one may follow the steps of forming a wire into a zig-zag configuration having a plurality of generally parallel limbs interconnected at alternate ends by connecting regions for carrying warp threads on the parallel limbs, feeding a plurality of warp threads to the wire, securing the warp threads on the wire, such as by knitting, sewing, or threading, to encompass the wire within a stitch of each row of warp thread, and attaching at least one ribbon having stiffening elements along its longitudinal axis to the wire carrier such that the at least one ribbon is secured substantially perpendicularly to the plurality of generally parallel limbs. The step of attaching the ribbon(s) may comprise feeding the ribbon(s) to the wire and trapping the at least one ribbon along its longitudinal axis between at least one row of warp thread and the wire or weaving the ribbon(s) through the parallel limbs of the wire. Alternatively, one may adhesively secure the ribbon(s) over at least one row of warp thread, and may then pass the wire carrier through pinch rollers to increase adhesion.

The foregoing and other features and advantages of the invention will be more readily understood and fully appreciated from the following detailed description, taken in conjunction with the accompanying drawings.

DETAILED DESCRIPTION OF THE PREFERRED EMBODIMENTS

Figure 1:
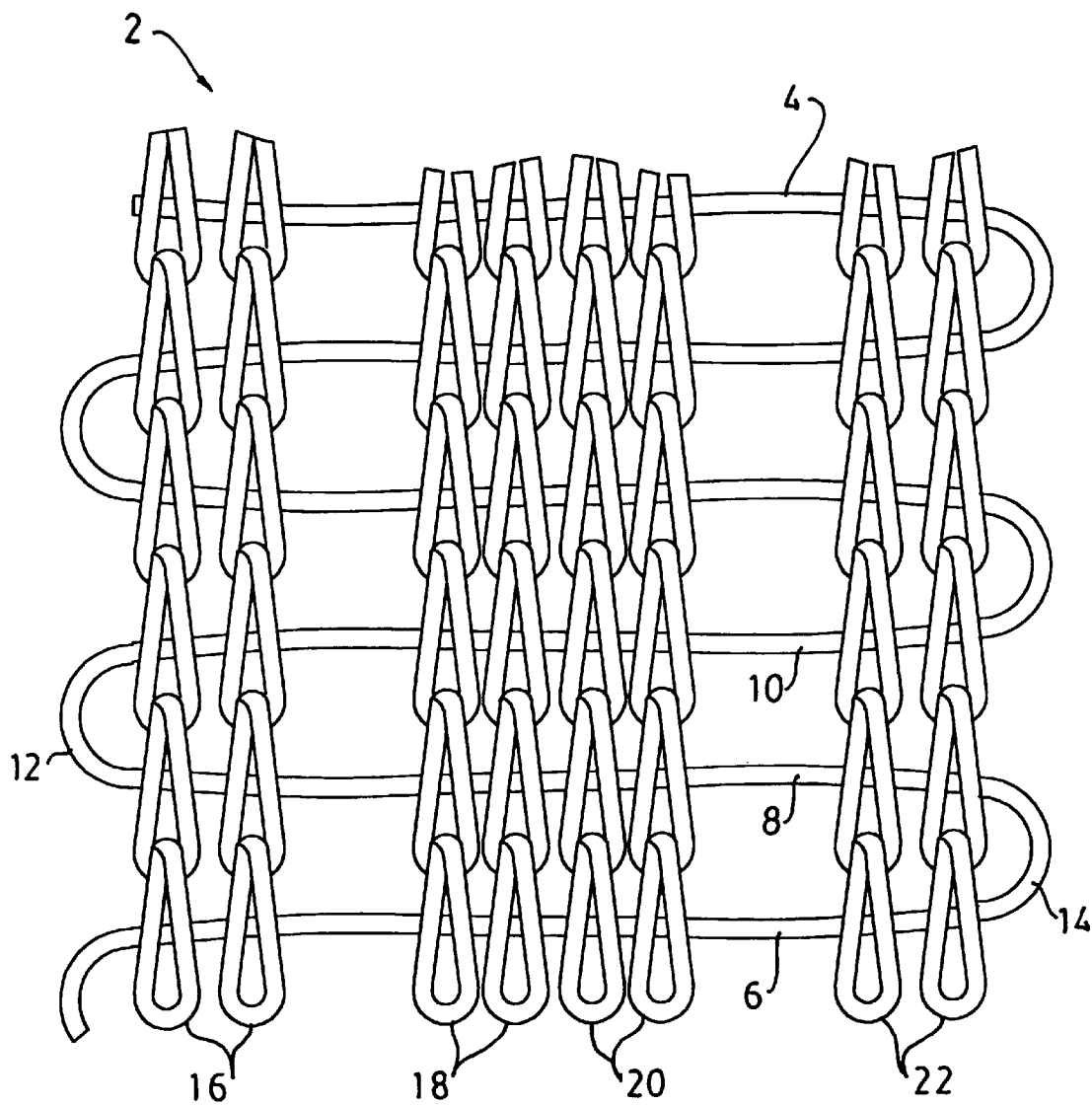
FIG. 1 shows a top view of a prior art wire carrier having rows of warp threads.

A wire carrier in accordance with this invention is shown in the drawing FIG. 1. The carrier 2 includes a length of wire support 4, preferably uncoated, formed into a weft having a zig-zag configuration of generally parallel limbs 6, 8, 10 interconnected at alternate ends by connecting regions 12, 14 which define the edges of the carrier. The zig-zag configuration of the wire can be extended to any desired length for carrying the warp threads. Preferably the wire 4 is an uncoated length of about 30 mil (0.76 mm) diameter steel wire, for example carbon steel or 301 stainless steel wire. The wire may be coated with a non-meltable protective layer, for example, with a rust protective coating.

A plurality of warp threads or yarns 16, 18, 20, 22, for example, are secured to the wire support 4, such as by knitting, sewing, or threading, to reinforce the wire support 4 and form a wire carrier 2. The warp threads encompass the wire 4 within a stitch of each row of warp thread. The warp threads are secured to the wire 4, preferably with chain stitching to minimize warp drift and the warp threads are pretensioned, for example, to 0.5–2 pounds per warp end, preferably one pound.

The warp threads preferably comprise a polymeric material.

By polymeric we mean a polymer based on organic or organosilicone chemistry. The polymer may be a synthetic resin or a natural fiber such as cotton. Synthetic resins are more durable and resistant to, although not free from, the stresses incurred during fabrication of the coated product, for example during extrusion, and are preferred. Suitable polymeric materials include, for example polyesters, polypropylenes and nylons. The polyester, polyethylene terephthalate, is particularly suitable. Preferably, the warp threads have a size of about 1000 denier.

If the spacing between the generally parallel limbs 6, 8, 10 increases due to elongation of the wire carrier during extrusion, then there will be a significant risk of shrinkage, to at least some degree, in the final product because when the limbs spread out the warp threads 16, 18, 20, and 22 are processed with a tensile stress. After the product is final sized, installed, and throughout the product's life, as the tensile stress in the warp threads decreases, the entire product will experience shrinkage. Therefore, while elongation may not significantly affect the manufacturing of a wire carrier, the customer receiving the final product may not be satisfied with the product due to shrinkage. The present invention overcomes this shrinkage problem by preventing the spacing between generally parallel limbs 6, 8, 10 from increasing during extrusion processes.

Figure 2:
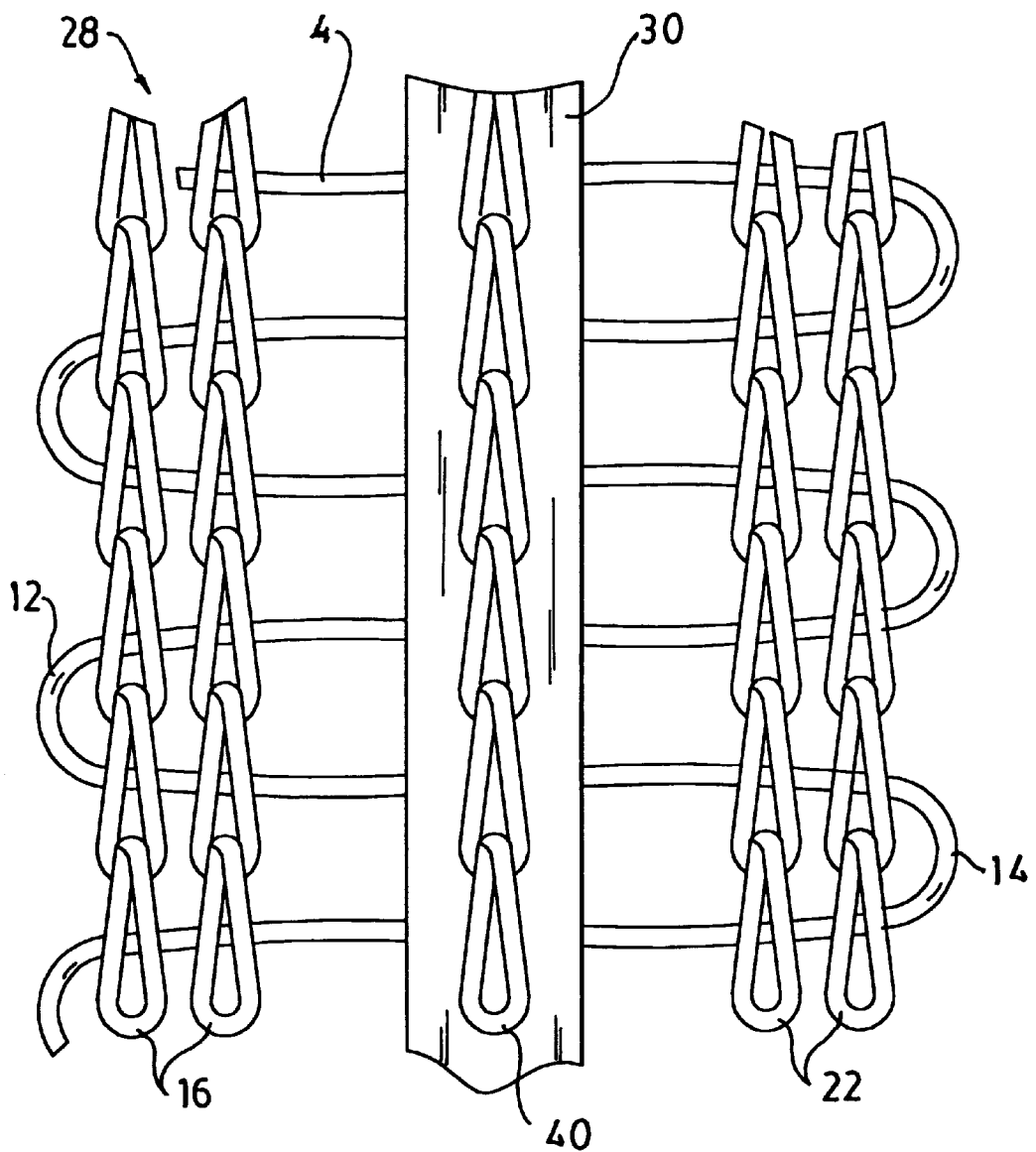
FIG. 2 shows a top view of an improved wire carrier having an elongation prevention mechanism in a preferred embodiment of the present invention.
Figure 3:
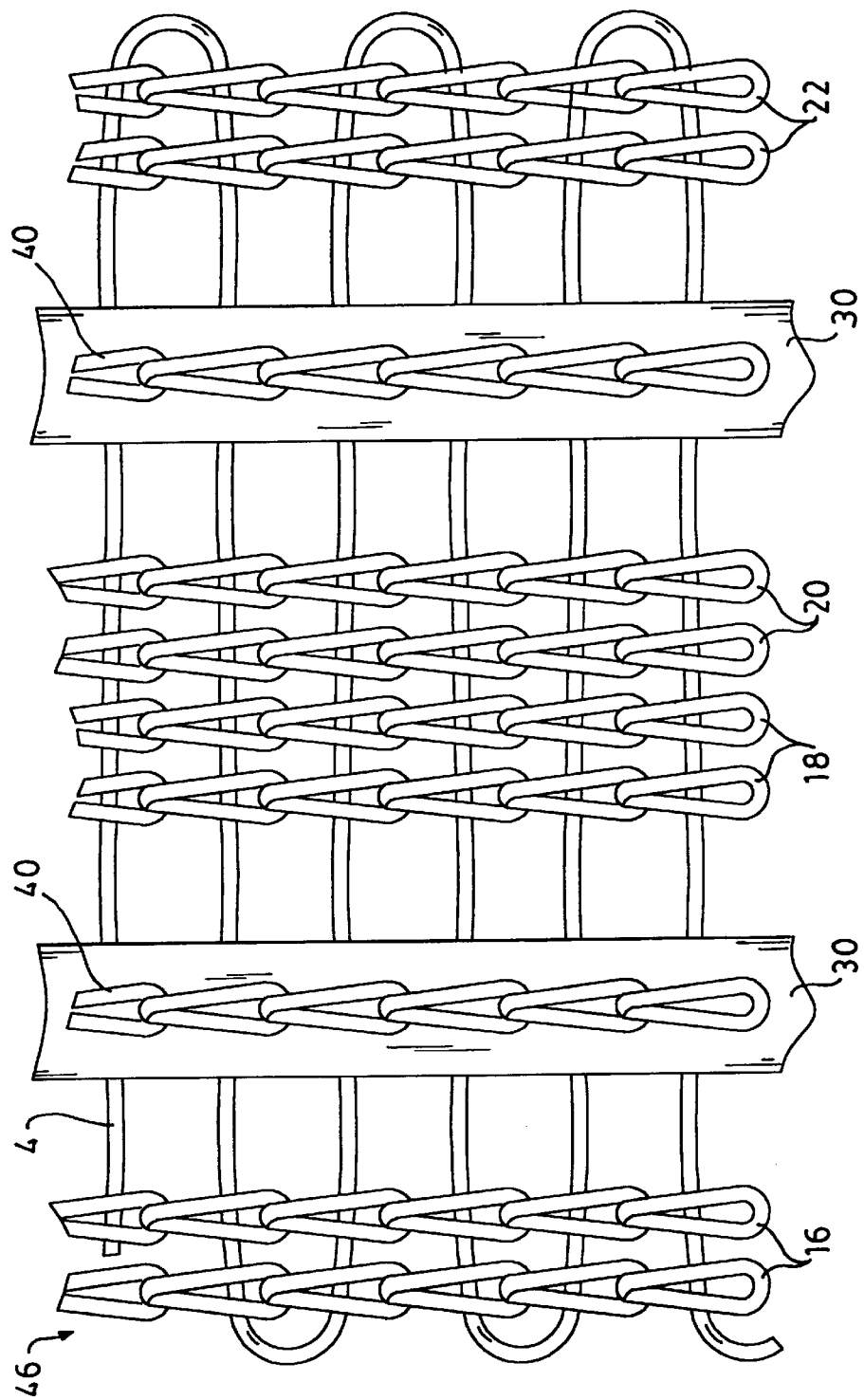
FIG. 3 shows a top view of an improved wire carrier having an elongation prevention mechanism in another preferred embodiment of the present invention.

A ribbon or tape 30 containing a stiffening element, such as, but not limited to fiberglass or carbon threads, along its longitudinal axis, is introduced and becomes a part of the wire carrier, as shown in FIGS. 2–5. In FIG. 2, a relatively small wire carrier 28 with warp threads 16 and 22 adjacent connecting regions 12 and 14 is shown with ribbon 30 introduced along a middle portion of the wire carrier 28. The ribbon 30 is secured to the wire carrier 28 by warp threads 40 which are threaded on the wire 4 in a manner corresponding to the method of attaching the warp threads 16 and 22, such as by chain stitching, although alternate methods of sewing, stitching, or knitting are within the scope of this invention. The ribbon 30 becomes trapped between the threads 40 and the wire 4. As shown in FIG. 3, a larger wire carrier 46 is shown with warp threads 16, 18, 20, and 22 as in FIG. 1. The improved carrier 46 is provided with a reinforcing ribbon 30 positioned between warp threads 16 and warp threads 18, and a reinforcing ribbon 30 positioned between warp threads 20 and warp threads 22. Thus, the larger wire carrier 46 is provided with elongation prevention mechanisms evenly distributed about the width of the carrier 46. Although two specific embodiments of wire carriers and placement of reinforcing ribbons 30 are shown, it should be understood that alternate arrangements of warp threads and ribbons are within the scope of the present invention. For example, any or all of warp threads 16, 18, 20, and 22 could be used to secure ribbon 30 to the wire 4.

Figure 4:
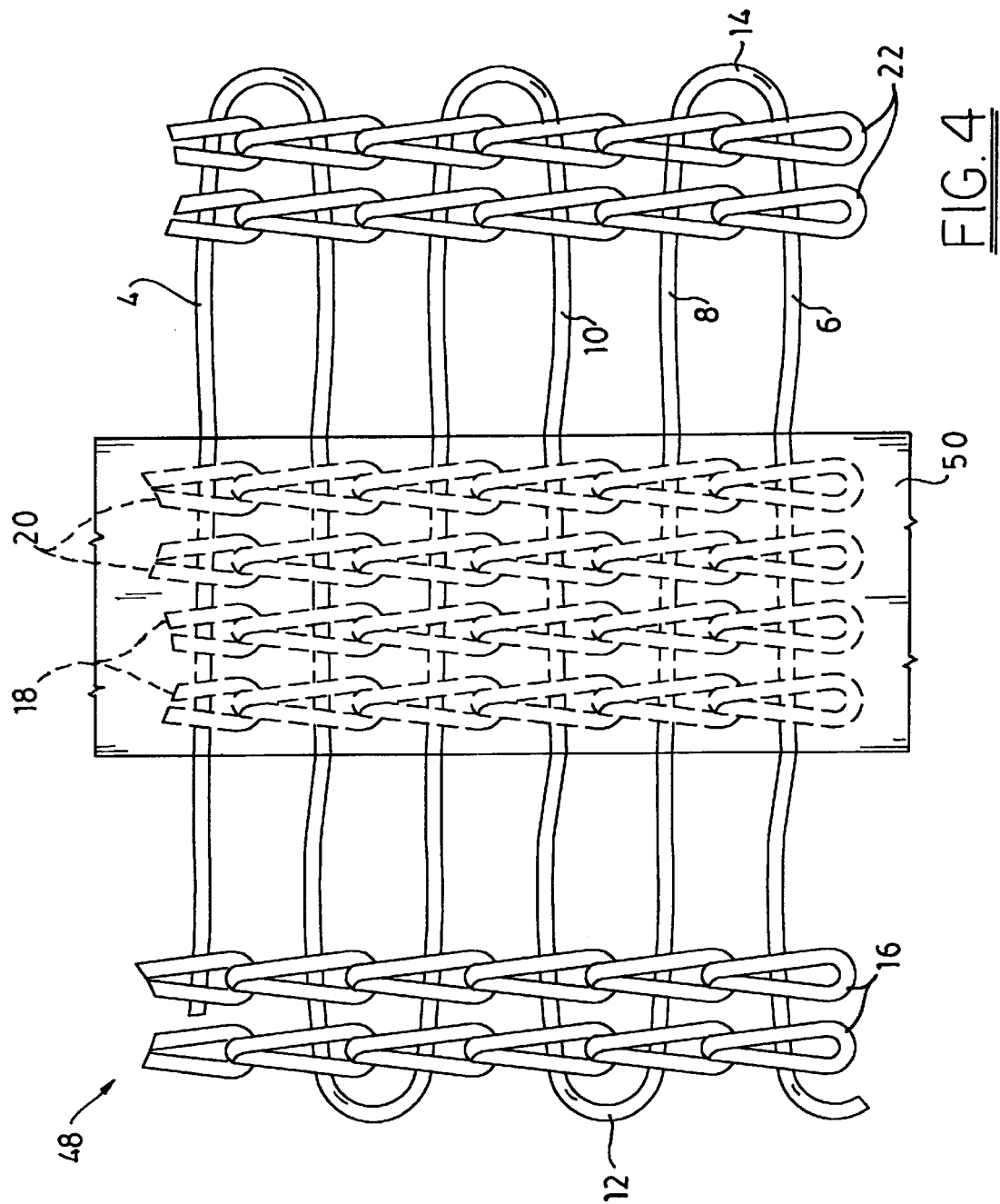
FIG. 4 shows a top view of an improved wire carrier having an elongation prevention mechanism in yet another preferred embodiment of the present invention.

Turning now to FIG. 4, an alternate preferred embodiment of the present invention is shown. In this embodiment, the wire carrier 48 is shown with warp threads 16, 18, 20, and 22 as in FIG. 1, with warp threads 18 and 20 shown in phantom. Reinforcing tape 50 is positioned over warp threads 18 and 20 and between warp threads 16 and 22. Reinforcing tape 50 may be adhesively secured to the warp threads 18 and 20. Alternatively, a ribbon 30 (not shown) could be adhered to the wire weft 4 such as by a latex covering. Although not shown, warp threads 16 and 22 could also be covered by separate reinforcing tapes 50. Also, any arrangement of warp threads used and subsequently covered by tape 50 would be within the scope of this invention. The reinforcing tape 50 prevents the wire carrier 48 from elongating during processing and prior art wire carriers can be manufactured by simply adding a taping step as opposed to changing any preexisting manufacturing steps.

Figure 5:
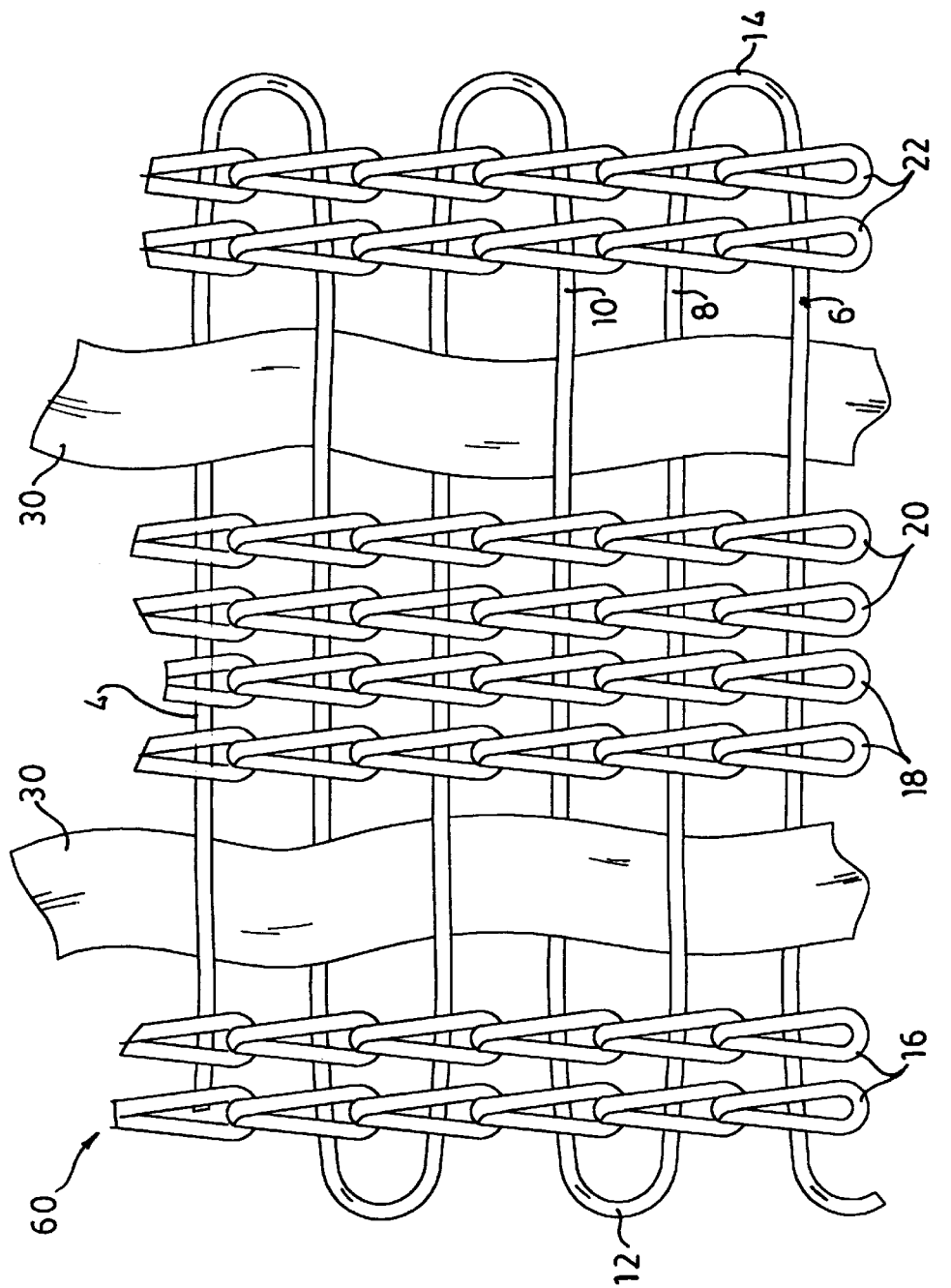
FIG. 5 shows a top view of an improved wire carrier

Yet another alternate preferred embodiment of the present invention is shown in FIG. 5. In this embodiment, the wire carrier 60 is shown with warp threads 16, 18, 20, and 22 as in FIG. 1. Ribbons 30 are shown placed between warp threads 16 and 18 and between warp threads 20 and 22, similar to the embodiment shown in FIG. 3. In this embodiment, however, the ribbons 30 are weaved within the wire weft 4 such that the ribbons 30 pass over and under alternating generally parallel limbs 6, 8, 10, thus eliminating the need for additional rows of securing warp threads 40.

The above described embodiments are illustrative of some embodiments for incorporating an elongation prevention mechanism into a wire carrier. Other embodiments not herein described are within the scope of this invention so long as the wire carrier is prevented from elongating during extrusion to prevent subsequent shrinkage in a final product.

Figure 6:
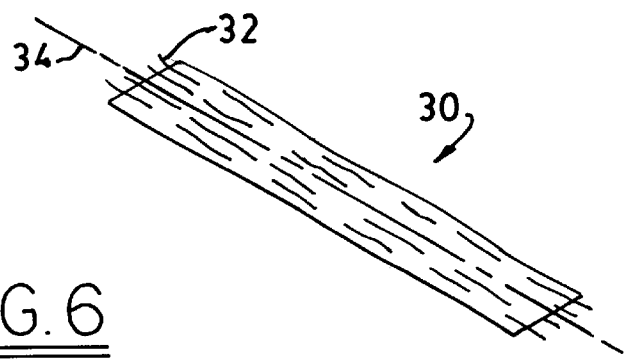
FIG. 6 shows a top view of a ribbon for use as an elongation prevention mechanism in the present invention.
Figure 7:
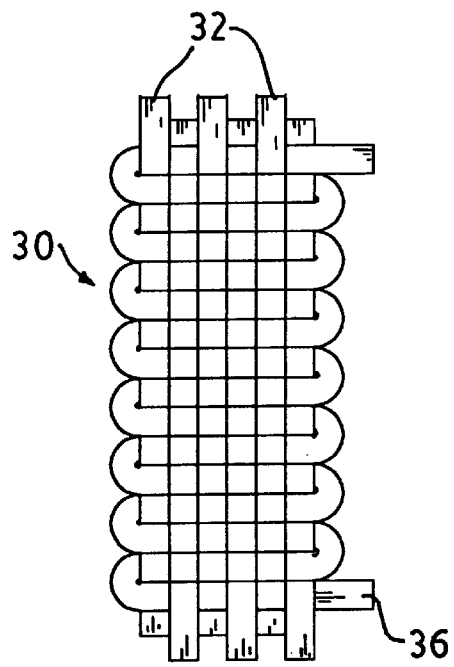
FIG. 7 shows a detail top view of a ribbon for use as an elongation prevention mechanism in one embodiment of the present invention.
Figure 8:
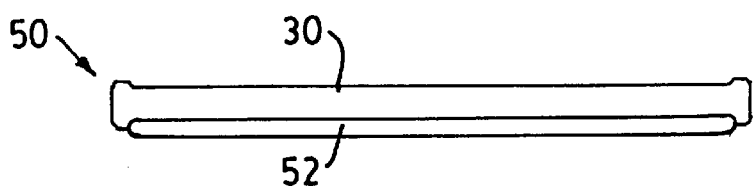
FIG. 8 shows a side view of a ribbon for use as an elongation prevention mechanism in the preferred embodiment of the present invention depicted in FIG. 4.

As shown in FIG. 6, the ribbon 30 is provided with stiffening elements 32 generally parallel to the longitudinal axis 34 of the ribbon 30. The stiffening elements 32 may comprise fiberglass or carbon threads, but may also comprise any other element with a zero to very low elongation factor. As shown in FIG. 7, where the size of the elements are exaggerated for clarity, the stiffening elements 32 may be held together in a weave by a weft thread 36. The weft thread 36 may also be a fiberglass or carbon thread, or other element with a zero to very low elongation factor, although its composition is irrelevant to the prevention of elongation in the wire carrier. As shown in FIG. 8, the ribbon 30 may be provided with a lower layer of adhesive 52 to form the tape 50 for use in the embodiment of the improved wire carrier depicted in FIG. 4.

Because the stiffening elements 32 in the ribbon or tape 30, 50, are not individually tied or stitched to the wire carrier, they do not suffer from tightening and loosening about the wire carrier as do warp threads. The stiffening elements 32 pass over, or over and under, the wire carrier without looping about the wire carrier, that is, without having any of the stiffening elements 32 cross over themselves such that each stiffening element passes each limb only once.

The ribbon 30 or tape 50, being an integral part of the wire carrier, prevents elongation of the wire carrier during subsequent manufacturing operations. The prevention of this elongation in turn prevents the warp threads from being processed with a tensile stress which after rubber extrusion can cause the part to "shrink" after being final sized, installed and throughout its life.

The ribbon or tape can be applied to all wire carrier products that use any thread or yarns which will have elongation during subsequent processing at extrusion houses. The stiffening element in the ribbon/tape prevents the wire carrier from elongating initially while being processed, and, once encapsulated by rubber or other compounds, will not allow the other threads or yarns to collapse and/or buckle allowing the finished part to retain its original length. Some of the advantages thus resulting from the present invention include a carrier which is provided with increased resistance to elongation, the number of other threads and yarns in the wire carrier is reduced, and there is more precise control of length at the finishing operations.

In a method for forming the wire carrier of the present invention, the wire is fed from a supply drum through the wire guide to form the wire weft of the carrier into a zig-zag configuration on which the warp threads are secured, for example, with chain stitching. A plurality of warp threads is fed to the wire from a beam or a plurality of supply cones, under a tension of from about 0.5–2 pounds per warp end, preferably about 1 pound. In the embodiment using ribbon 30 without adhesive, the ribbon may be fed from a cone and secured by warp threads simultaneously as any other warp threads are disposed onto the wire, or, in the embodiment which weaves the ribbon 30 through the generally parallel limbs, the ribbon 30 may be weaved through the wire weft prior to threading the warp threads. In the embodiment using tape 50, a strip of fiberglass tape may be attached over each group of warp threads or over selective groups of warp threads immediately after threading (i.e., knitting, sewing, or otherwise securing the threads), and before the carrier goes onto the take up. Pinch rollers may be used to increase adhesion. The material may then be sent to a rewind station, as it could be produced defect free. Alternatively, the material could be shipped directly from a knitter which would eliminate blocking totally. To save space and tape, the tape may be installed at the blocker instead of at the knitter. The material would go to blocking for tape installation.

Thus, it is apparent that there has been provided, in accordance with the invention, a wire carrier and a method for making a wire carrier that fully satisfies the objects and advantages set forth above. The wire carrier is produced with ribbon or tape strips having stiffening elements, such as fiberglass threads installed at specific places which remains adhered to the carrier and becomes part of the rubber extrusion. The strength of the stiffening elements prevent stretching of the wire carrier during the extrusion process, which eliminates the memory effect of the warp threads that contributes to shrink back. In addition, the fiberglass staples act as a deterrent to the shrink realized from a decrease in the tensile stress of the warp threads, that results during the curing of the rubber and the environmental effect. While the invention has been described in conjunction with specific embodiments thereof, it is evident that many alternatives, modifications, and variations will be apparent to those skilled in the art in light of the foregoing description. For example, although the ribbon 30 is shown with only one securing warp thread 40, a wider ribbon 30 could be provided with two or more warp threads 40 securing the ribbon to a wire carrier. In addition, although specific embodiments of improved wire carriers are shown in FIGS. 2–5, alternate arrangements such as two ribbons 30 positioned between the warp threads 16 and 22 of FIG. 2, or a ribbon 30 positioned between warp threads 18 and 20 of FIG. 3, or a wide tape 50 covering all warp threads in FIG. 4, or various weave formations in FIG. 5 are all within the scope of the present invention. Accordingly, the present invention is intended to embrace all such alternatives, modifications, and variations as fall within the spirit and broad scope of the appended claims.

What is claimed is:

1. A wire carrier for use in a weather seal comprising:
a wire folded into a zig-zag configuration so as to have a plurality of generally parallel limbs interconnected at alternate ends by connecting regions for carrying warp threads on the parallel limbs, the wire carrier having a width substantially defined by a length of one of the plurality of generally parallel limbs;
a plurality of warp threads secured to the wire to encompass the wire within a stitch of each row of warp thread; and,
at least one ribbon having stiffening elements along its longitudinal axis and trapped along its longitudinal axis between a securing row of warp thread and the wire for substantially preventing spacing between adjacent limbs from increasing during an extrusion process by substantially eliminating tensile stresses which could otherwise form in the plurality of warp threads during the extrusion process, the at least one ribbon secured to the wire such that the stiffening elements extend substantially perpendicularly to the plurality of generally parallel limbs.

2. The wire carrier of claim 1 wherein the stiffening elements comprise fiberglass threads.

3. The wire carrier of claim 2 wherein the fiberglass threads are secured to each other in a weave by a weft thread.

4. The wire carrier of claim 1 wherein the at least one ribbon is secured to the wire by chain stitches in the securing row of warp thread.

5. The wire carrier of claim 4 wherein the plurality of warp threads comprises at least one row of warp threads on both sides of the at least one ribbon, wherein each row of warp threads is spaced apart along the width of the knitted wire carrier.

6. A wire carrier for use in a weather seal comprising:
a wire folded into a zig-zag configuration so as to have a plurality of generally parallel limbs interconnected at alternate ends by connecting regions for carrying warp threads on the parallel limbs;
a plurality of warp threads secured to the wire to encompass the wire within a stitch of each row of warp thread; and,
at least one ribbon having stiffening elements along its longitudinal axis, the at least one ribbon adhesively secured over at least one row of warp threads such that the stiffening elements extend substantially perpendicularly to the plurality of generally parallel limbs.

7. The wire carrier of claim 6 wherein the at least one ribbon comprises a tape with an adhesive coating on one side of the tape.

8. The wire carrier of claim 6 wherein the stiffening elements have a substantially negligible elongation factor.

9. The wire carrier of claim 6 wherein each stiffening element in the at least one ribbon crosses each limb in the plurality of generally parallel limbs only once.

10. A wire carrier comprising:
a wire folded into a zig-zag configuration so as to have a plurality of generally parallel limbs interconnected at alternate ends by connecting regions for carrying warp threads on the parallel limbs;
a plurality of warp threads secured to the wire; and,
at least one ribbon having stiffening elements along its longitudinal axis for substantially preventing spacing between adjacent limbs from increasing by substantially eliminating tensile stresses which could otherwise form in the plurality of warp threads, the at least one ribbon formed by a weft thread securing the stiffening elements to each other in a weave.

11. The wire carrier of claim 10, wherein the at least one ribbon is adhesively secured over at least one row of warp threads.

12. The wire carrier of claim 10 wherein the at least one ribbon comprises a single ribbon positioned substantially perpendicularly to and in a central location along the plurality of generally parallel limbs.

13. The wire carrier of claim 10 wherein the at least one ribbon comprises a first ribbon positioned between a first set of warp threads and a second ribbon positioned between a second set of warp threads, the first ribbon, the second ribbon, the first set of warp threads, and the second set of warp threads being spaced apart along the width of the wire carrier.

14. The wire carrier of claim 10 wherein the at least one ribbon is weaved through the plurality of generally parallel limbs.

15. The wire carrier of claim 10 wherein the at least one ribbon is secured to the wire with latex.

16. The wire carrier of claim 10 wherein the stiffening elements comprise fiberglass threads.

17. A wire carrier compromising:
a wire folded into a zig-zag configuration so as to have a plurality of generally parallel limbs interconnected at alternate ends by connecting regions; and,
a plurality of individual and substantially parallel stiffening elements connected together in side-by-side relationships to form a single ribbon, the ribbon having a width defined by a combined width of the stiffening elements, wherein the ribbon is secured to the wire such that the stiffening elements cross each limb in the plurality of generally parallel limbs only once;

a plurality of rows of warp threads secured to the wire to encompass the wire within a stitch of each row of warp threads, wherein the ribbon is adhesively secured over at least one row of warp threads.

18. A wire carrier comprising:

a wire folded into a zig-zag configuration so as to have a plurality of generally parallel limbs interconnected at alternate ends by connecting regions; and, a plurality of individual and substantially parallel stiffening elements connected together in side-by-side relationships to form a single ribbon, the ribbon having a width defined by a combined width of the stiffening elements, wherein the ribbon is secured to the wire such that the stiffening elements cross each limb in the plurality of generally parallel limbs only once; wherein the stiffening elements are secured to each other in a weave by a weft thread.

19. A wire carrier comprising:

a wire folded into a zig-zag configuration so as to have a plurality of generally parallel limbs interconnected at alternate ends by connecting regions; and, a plurality of individual and substantially parallel stiffening elements connected together in side-by-side relationships to form a single ribbon, the ribbon having a width defined by a combined width of the stiffening elements, wherein the ribbon is secured to the wire such that the stiffening elements cross each limb in the plurality of generally parallel limbs only once; wherein the ribbon is trapped along its longitudinal axis between a securing row of warp thread and the wire.

20. A wire carrier comprising:

a wire folded into a zigzag configuration so as to have a plurality of generally parallel limbs interconnected at alternate ends by connecting regions; and, a plurality of individual and substantially parallel stiffening elements connected together in side-by-side relationships to form a single ribbon, the ribbon having a width defined by a combined width of the stiffening elements, wherein the ribbon is secured to the wire such that the stiffening elements cross each limb in the plurality of generally parallel limbs only once; wherein the ribbon is weaved through the plurality of generally parallel limbs.

21. A wire carrier comprising:

a wire folded into a zig-zag configuration so as to have a plurality of generally parallel limbs interconnected at alternate ends by connecting regions; and, a plurality of individual and substantially parallel stiffening elements connected together in side-by-side relationships to form a single ribbon, the ribbon having a width defined by a combined width of the stiffening elements, wherein the ribbon is secured to the wire such that the stiffening elements cross each limb in the plurality of generally parallel limbs only once; wherein the ribbon is secured to the wire with latex.

22. A wire carrier comprising:

a wire folded into a zig-zag configuration so as to have a plurality of generally parallel limbs interconnected at alternate ends by connecting regions; and, a stiffening ribbon having a low elongation factor, wherein the ribbon is secured to the wire in a weave by passing the entire ribbon in one piece alternating rows of limbs and under alternating rows of limbs such that a longitudinal axis of the ribbon extends substantially perpendicularly to the plurality of generally parallel limbs and wherein the ribbon crosses each limb in the plurality of generally parallel limbs only once.

23. A wire carrier comprising:

a wire folded into a zig-zag configuration so as to have a plurality of generally parallel limbs interconnected at alternate ends by connecting regions; and, at least one stiffening element comprising a fiberglass ribbon wherein the stiffening element is secured to the wire such that a longitudinal axis of the stiffening element extends across the plurality of generally parallel limbs, and wherein the stiffening element crosses each limb in the plurality of generally parallel limbs only once.

* * * * *